US00RE44394E

(19) United States
(12) Reissued Patent
Miller et al.

(10) Patent Number: US RE44,394 E
(45) Date of Reissued Patent: Jul. 23, 2013

(54) POINT OF LAW SEARCH SYSTEM AND METHOD

(75) Inventors: David J. Miller, Dayton, OH (US); Harry Silver, Shaker Heights, OH (US); Andrew Freisthler, Lebanon, OH (US)

(73) Assignee: LexisNexis, a division of Reed Elsevier Inc., Miamisburg, OH (US)

(21) Appl. No.: 13/434,541

(22) Filed: Mar. 29, 2012

Related U.S. Patent Documents

Reissue of:
(64) Patent No.: 7,689,546
Issued: Mar. 30, 2010
Appl. No.: 11/204,993
Filed: Aug. 17, 2005

U.S. Applications:
(60) Provisional application No. 60/603,277, filed on Aug. 23, 2004.

(51) Int. Cl.
*G06F 17/30* (2006.01)

(52) U.S. Cl.
USPC ..... 707/708; 707/728

(58) Field of Classification Search
USPC ..... 707/2, 3, 5, 102, 1, 4, 10, 100, 706–708, 707/728, 778, 797, 805; 715/514, 517
See application file for complete search history.

(56) References Cited

U.S. PATENT DOCUMENTS

| | | | |
|---|---|---|---|
| 5,692,176 | A | 11/1997 | Holt et al. |
| 5,771,378 | A | 6/1998 | Holt et al. |
| 5,794,236 | A | 8/1998 | Mehrle |
| 5,819,260 | A | 10/1998 | Lu et al. |
| 6,772,149 | B1 | 8/2004 | Morelock et al. |
| 7,065,514 | B2 | 6/2006 | Yang-Stephens et al. |
| 7,529,756 | B1 | 5/2009 | Haschart et al. |
| 2003/0115213 | A1 | 6/2003 | Mielenhausen |
| 2004/0059726 | A1 | 3/2004 | Hunter et al. |
| 2006/0248440 | A1 | 11/2006 | Rhoads et al. |

OTHER PUBLICATIONS

Minutes of oral proceedings before the Examining Division on Apr. 23, 2012.
Decision to refuse European Patent application 05 786 391.2 on Apr. 23, 2012.
URI Guttman and Larry Rosler, "A Fresh Look at Efficient Perl Sorting".
European Patent Search Report, Jul. 27, 2009.
EPO Summons to attend oral proceedings, Jan. 11, 2012.

*Primary Examiner* — Cam-Linh Nguyen
(74) *Attorney, Agent, or Firm* — Dinsmore & Shohl LLP

(57) ABSTRACT

A "More Like This Headnote" search relates online headnotes intelligently so that users have the means to retrieve related headnotes quickly and easily. This is achieved by using a tailored search type in the search engine, which is designed to handle the text of a headnote as a search string. Retrieval logic then presents the search results to the user in a "Virtual Digest" view comprising related headnotes and case materials, sorted by user-selected options.

20 Claims, 11 Drawing Sheets

LexisNexis™ Total Research System

Search | Research Tasks | Search AllMsgr | Get a Document | Shepard's®

Switch Client | Preferences | Feedback | Sign Out | Help

Dossier | Practice Area Pages | ECLIPSE™ | History

FOCUS™ Terms | Search Within All Documents | Go | FOCUS Options...

View: Cite | Digest | KWIC | Full | Custom

Sort By: Court/Date

PREV | 301-350 of 1451 NEXT

FAST Print | Print | Download | Fax | Email | Text Only

Show Headnotes Only | In-Depth Discussions

10

HN16 - Although reinstatement is usually the preferred remedy for a violation of the Age Discrimination in Employment Act, 29 U.S.C.S. § 621 et seq., reinstatement is not always appropriate. *For example, there may be no position available or the* employer-employee relationship may be pervaded by hostility. When reinstatement is infeasible or inappropriate, front pay may be appropriate to make the plaintiff whole. In determining whether to award front pay, courts should consider all of the circumstances of the case. Front pay may be indicated especially when the plaintiff has no reasonable prospect of obtaining comparable employment or when the time period for which front pay is to be awarded is relatively short. On the other hand, front pay may be less appropriate when liquidated damages are awarded. Of course, the duty to mitigate damages may limit the amount of front pay available. More Like This Headnote 10a HN17 - Although an unreasonable refusal of an offer to reinstate will preclude recovery of front pay under the Age Discrimination in Employment Act, 29 U.S.C.S. § 621 et seq., a plaintiff need not request reinstatement as a prerequisite to recovering front pay when reinstatement would be inappropriate. More Like This Headnote HN18 - The decision whether or not to award front pay for a violation of the Age Discrimination in Employment Act, 29 U.S.C.S. § 621 et seq., is within the discretion of the district court and is only reviewed for an abuse of discretion. More Like This Headnote 349. Nolting v. Yellow Freight Sys., 799 F.2d 1192, 1986 U.S. App. LEXIS 28886 (8th Cir., August 25, 1986, Filed)

OVERVIEW: Dismissal of the former employee's age discrimination claim was proper because the jury was properly instructed and because the former employee failed to raise a genuine issue of material fact to counter the order of partial summary judgment.

HN4 - Liquidated damages are available only upon proof of a willful violation of the Age Discrimination in Employment Act, 29 U.S.C.S. § 626(b). More Like This Headnote 350. Bartman v. Allis-Chalmers Corp., 799 F.2d 311, 1985 U.S. App. LEXIS 28826 (7th Cir., August 20, 1986, Decided)

OVERVIEW: As employees elected to take early retirement because their collective bargaining agreement was about to expire and employer and union were still negotiating a new one, employees could not show that they were constructively discharged under ADEA.

OPINION: ... [*312] Appellants are sixty-five former employees of Allis-Chalmers Corporation. In 1983 they filed this law suit under the Age Discrimination in Employment Act (ADEA), 29 U.S.C. § 621 et seq., seeking damages and reinstatement and naming Allis-Chalmers ("A-C") and their union, International Union, United Automobile, Aerospace & Agricultural Implement Workers of America and its Local No. 248 ("the Union") as defendants. The district ...

Explore | Page | Select a Reporter | Go | Doc 4 of 1451 | Term | Go at

Figure 1

LexisNexis

Company Dossier · Practice Area Pages | Change Client · Options · F

Search | Search Advisor | Get a Document | Shepard's®- Check a Citation

More Like This Headnote Tips

20 HN16 - Although reinstatement is usually the preferred remedy for a violation of the Age Discrimination in Employment Act, 29 U.S.C.S. § 621 et seq., reinstatement is not always appropriate. For example, there may be no position available or the employer-... More 20a Jurisdiction:

- (•) Original source: Labor Cases, Federal
- ( ) Federal and State Courts: All Federal & State Courts (20c)
- ( ) Combined Federal Courts: All Federal Courts
- ( ) US Supreme Court
- ( ) US Courts of Appeals: All Circuits
- ( ) US District Courts: All US District Courts
- ( ) US Special Courts: US Court of Federal Claims
- ( ) State Courts: All State Courts Optional: Restrict by Date 20b (•) No Date Restrictions ( ) From To 20d [ ] In the future, run search in the last source I was in and skip this page Search (20e) Cancel Return to top HN16 - Although reinstatement is usually the preferred remedy for a violation of the Age Discrimination in Employment Act, 29 U.S.C.S. § 621 et seq., reinstatement is not always appropriate. For example, there may be no position available or the employer-employee relationship may be pervaded by hostility. When reinstatement is infeasible or inappropriate, front pay may be appropriate to make the plaintiff whole. In determining whether to award front pay, courts should consider all of the circumstances of the case. Front pay may be indicated especially when the plaintiff has no reasonable prospect of obtaining comparable employment or when the time period for which front pay is to be awarded is relatively short. On the other hand, front pay may be less appropriate when liquidated damages are awarded. Of course, the duty to mitigate damages may limit the amount of front pay available.

Figure 2

POINT OF LAW SEARCH SYSTEM AND METHOD

Matter enclosed in heavy brackets [ ] appears in the original patent but forms no part of this reissue specification; matter printed in italics indicates the additions made by reissue.

CROSS-REFERENCE TO RELATED APPLICATIONS

The present patent application is based on, and claims priority from, U.S. provisional Application No. 60/603,277, filed Aug. 23, 2004, which is incorporated herein by reference in its entirety.

COPYRIGHTED MATERIAL

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to a point of law search system and method using interactive legal databases, particularly interactive online legal databases. More specifically, the invention relates to a point of law search system and method that presents search results that pinpoint the location of a point of law in a retrieved document.

2. Related Art

"Headnote" is used herein to refer to a point of law identified by an editor in the body of a caselaw document; the points of law are reproduced at the top of the case so that researchers can easily determine what the case is about.

Interactive databases, and particularly interactive online legal databases, commonly have a "more like select text" feature that allows a user to search for additional cases based on text selected by a user in a case identified by the user as being of relevance to the user's research. A user can achieve similar search results by using the text of a headnote in a search request. However, a conventional "more like select text" or headnote search does little or nothing to point the user to the applicable point of law discussion within a document in an answer set.

It is to the solution of these and other problems that the present invention is directed.

SUMMARY OF THE INVENTION

It is accordingly a primary object of the present invention to provide an interactive database search feature that can leverage the editorial content contained in cases to identify other cases that discuss the same point of law.

It is accordingly another of the present invention to provide an interactive database search feature that can point the user to the applicable point of law discussion within a set of cases that discuss the same point of law.

It is still another object of the present invention to provide an interactive database search feature that can relate online headnotes intelligently so that users have the means to quickly retrieve related headnotes without undue hardship, extraneous navigation, or specialized search skills.

These and other objects of the present invention are achieved by a "More Like This Headnote" search that relates online headnotes intelligently so that users have the means to retrieve related headnotes quickly and easily. This is achieved by using a tailored search type in the search engine, which is designed to handle the text of a headnote as a search string. Retrieval logic then presents the search results to the user in a "Virtual Digest" view comprising related headnotes and case materials, sorted by user-selected options.

Other objects, features, and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, and in which:

FIG. 1 illustrates a portion of an exemplary screen display of the results of an interactive database search, presenting headnotes and "More Like This Headnote" links.

FIG. 2 illustrates an exemplary screen display of a "More Like This Headnote" dialog box.

DETAILED DESCRIPTION OF THE PREFERRED EMBODIMENTS

Figure 3:
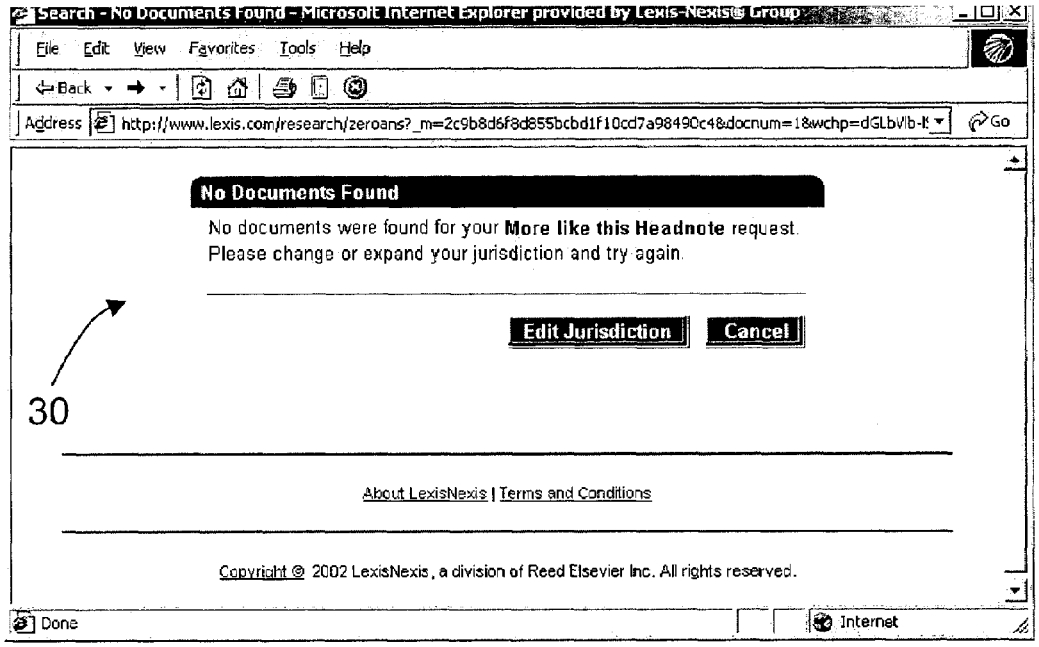
FIG. 3 illustrates an exemplary screen display of a "No Documents Found" message following running of a "More Like This Headnote" search.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

The present invention is described below with reference to flowchart illustrations of methods, apparatus (systems), and computer program products according to an embodiment of the invention. It will be understood that each block of the flowchart illustrations, and combinations of blocks in the flowchart illustrations, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

The present invention is preferably practiced within a client/server programming environment. As is known by those skilled in this art, client/server is a model for a relationship between two computer programs in which one program, the client, makes a service request from another program, the server, which fulfills the request. Although the client/server model can be used by programs within a single computer, it is more commonly used in a network where computing functions and data can more efficiently be distributed among many client and server programs at different network locations.

As is known to those with skill in this art, client/server environments may include public networks, such as the Internet, and private networks often referred to as "Intranets" and "Extranets." The term "Internet" shall incorporate the terms "Intranet" and "Extranet" and any references to accessing the Internet shall be understood to mean accessing an Intranet and/or and Extranet, as well. The term "computer network" shall incorporate publicly accessible computer networks and private computer networks.

The following definitions are used herein:

Digest View or Digest Format: A view that displays matching headnotes and the best paragraph display format in a single answer set.

Best Paragraph or Best Text: A format in which a portion of the text case is displayed. The terms displayed preferably are from one of the most relevant discussions in the case, and the entire chunk of text will be about the size of a paragraph. Additional information about the case, such as the name and citation, is also included.

XSLT: A style sheet language that allows authors and users to transform XML documents for formatting purposes.

Substring function: The SUBSTRING function in XSLT returns a character or binary string containing string-length characters of source-string, starting at the character specified by start-position, and in the same sequence as they appear in source-string. If any of these positions are before the start or after the end of source-string, then no character is returned for that position. If all positions are outside the source string, an empty string is returned.

The point of law search system and method in accordance with the present invention provides a "More Like This Headnote" search that has the ability to take the language of a headnote (the "source" headnote) and find those cases that have headnotes that closely match the language and/or meaning of the source headnote, as well as the ability to find the "best paragraphs" or "best text" in other cases having language not expressed in headnote form which nonetheless matches the language contained in the original source headnote.

While the processes of creating a headnote and carrying out a "More Like This Headnote" search is not limited to any specific database search, for exemplary purposes, in the implementation described herein, the present invention is presented as a service available through the Lexis™ Research System interactive, online, legal databases. However, it will be appreciated by those of skill in the art that the present invention is not limited to interactive legal databases, and can be implemented in association with interactive databases in other subject areas, using services other than the Lexis™ Research System, as long as the interactive databases include documents in which significant ideas are represented in headnotes.

In a "More Like This Headnote" search, the headnote can be used by an interactive legal database search engine to identify a set of answers (or "answer set") that are relevant to that point of law. The "More Like This Headnote" search relates online headnotes intelligently so that users have the means to quickly retrieve related headnotes without undue hardship, extraneous navigation, or specialized search skills. This is achieved by using a tailored search type in the search engine, which is designed to handle the text of a headnote as a search string. Retrieval logic then presents the search results to the user in a "Virtual Digest" view comprising related headnotes and case materials, sorted by user-selected options. Preferably, the "More Like This Headnote" search entertains single-click access from case-contained headnotes into the "Virtual Digest." The "More Like This Headnote" search thus allows users to leverage the editorial content contained in cases to identify other cases that discuss the same point of law.

Referring now to FIGS. 5-9, there are shown high level flow diagrams illustrating the steps included in the point of law search system and method.

Figure 5:
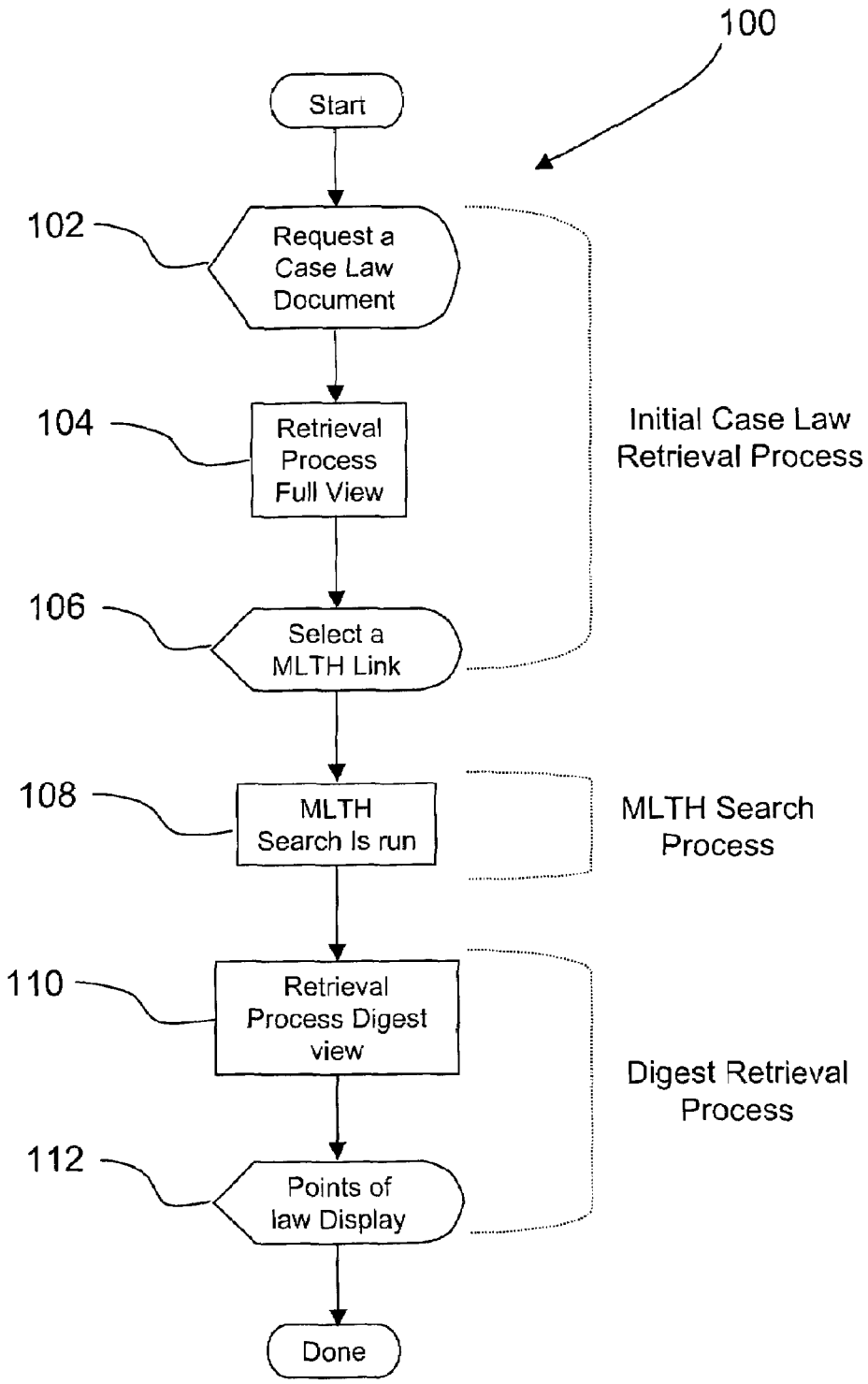
FIG. 5 is a high level flow diagram providing an overview of a point of law search system and method in accordance with the present invention.

FIG. 5 is a high level flow diagram providing an overview of a point of law search system and method 100 in accordance with the present invention. Blocks 102-112 of FIG. 5 represent the following steps:

102: The process begins when the user requests a case law document for FULL format. This request could be the result of a keyword search, a citation Get, or selecting a citation link from within another document.

104: The Lexis™ Research System processes the document retrieval request and inserts special More Like This Headnote (MLTH) links for headnotes within the requested case law document.

106: The Lexis™ Research System displays the document to the user and the user selects a MLTH link for a headnote that represents a point of law of interest to the user.

108: The Lexis™ Research System runs a MLTH search to locate documents with similar points of law. Documents are relevance ranked based upon statistical similarity to the point of law in the original headnote.

110: The Lexis™ Research System retrieves the highest ranked documents and displays them to the user in a Digest Format that highlights the similar point of law found in the document. The similar point of law may be one to many headnotes or a "best paragraph" that discusses the point of law.

112: The Digest formatted documents are displayed to the user.

Figure 6:
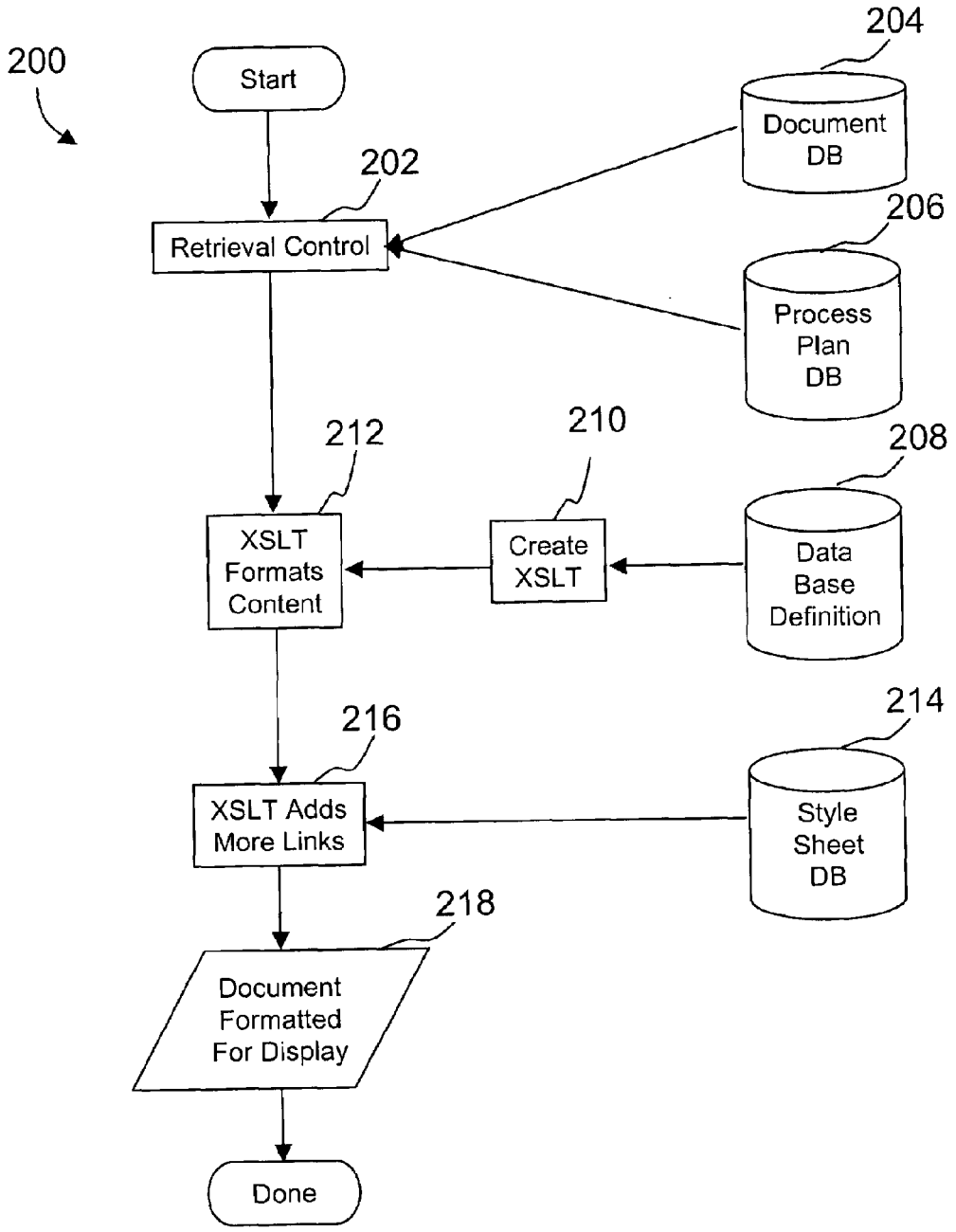
FIG. 6 is a high level flow diagram of the retrieval process for a document that will be the starting point of a "More Like This Headnote" search corresponding to block 104 of FIG. 5.

FIG. 6 is a high level flow diagram of the retrieval process 200 for the document that will be the starting point of a "More Like This Headnote" search corresponding to block 104 of FIG. 5 Blocks 202-218 of FIG. 6 represent the following steps:

202: A FULL format retrieval request is received by the Lexis Search and Retrieval (LSR) engine. The request is routed to the Common Retrieval Engine (CRE), a component within the LSR engine responsible for document formatting.

204: The CRE retrieves the requested document from its database.

206: The CRE locates and retrieves a retrieval process plan called a Source Control Document (SCD) based upon the document's assigned source identifier. This process plans includes the steps necessary to format the document.

208: The database definition (DBD) is accessed based upon the document's database assignment. The definition contains a list of the elements within the document that should be displayed for FULL format along with header text for the display.

210: The information from the DBD is used to construct an XSLT stylesheet that can transform the document from its native XML form into the FULL display form.

212: An XSLT engine is run to transform the document based upon the document rules.

214: An application specific XSLT style sheet is accessed from a collection of stylesheets. This stylesheet contains rules specific to the requesting application.

216: The XSLT engine performs the transformation. Part of this transformation constructs MLTH links for each headnote within the document unless the headnote begins with the text sequence of "See". Such sequences are used for a single statute reference and the headnote contains insufficient information to adequately describe a point of law.

218: The formatted document is ready for display at the user's web browser.

Figure 7:
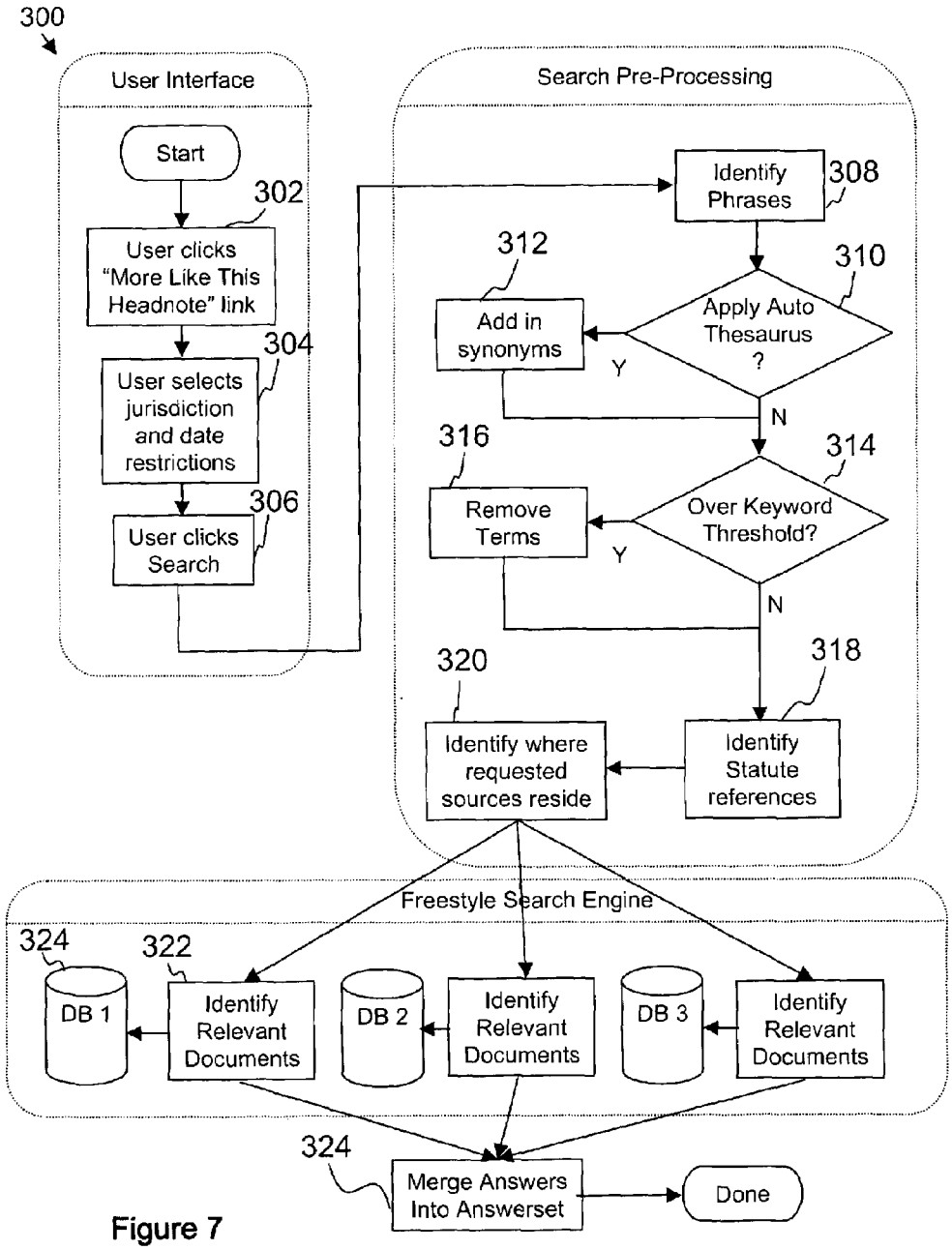
FIG. 7 is a high level flow diagram of the "More Like This Headnote" search process corresponding to block 108 of FIG. 5.

FIG. 7 is a high level flow diagram of the "More Like This Headnote" search process 300 corresponding to block 108 of FIG. 5. Blocks 302-316 of FIG. 7 represent the following steps:

302: A More Like This Headnote (MLTH) link is found following a LexisNexis headnote. These links will be present in any document view that shows the headnotes of a case.

304: After clicking a MLTH link, a user is presented with a search form allowing them to select a jurisdiction for the search along with any date restriction they would like applied. An example jurisdiction selection would be "Combined Federal Courts" with an example date restriction of "From Jan. 1, 1900".

306: Clicking on the search button on the MLTH search form will cause the jurisdiction and date information to be bundled with the headnote text and sent to the search pre-processing layer as a MLTH search.

308: Phrase recognition is done on the free form headnote text using the phrase identification process described in U.S. Pat. Nos. 5,771,378 and 5,819,260, which are incorporated herein by reference.

310: If the MLTH search requested a thesaurus be applied, then it will be processed. Depending on the implementation of the point of law search system and method in accordance with the present invention, the thesaurus inclusion may or may not be a user option. If it is not a user option, the bundled search request automatically indicates the desire for a legal thesaurus.

312: Synonyms found in the specified thesaurus are added to the search request. Each search term (single word or phrase) is checked for entries within the thesaurus. If an entry is found, the synonyms for that term are added to the search request. This thesaurus contains terms to normalize concepts between jurisdictions (for example, "driving while intoxicated" is a synonym for "driving under the influence").

314: If the number of keywords identified in the headnote text is greater than a set threshold, the request is sent to a process to remove terms.

316: Rules are applied to remove terms from the search request. Factors for this removal include the frequency of the term in the search request, whether or not the word is part of a phrase, and the normalized length of the term. The lower the frequency the more likely a term will be removed. The shorter the length, the more likely a term will be removed.

318: Statute references are identified and phrased. Statute references are identified by locating certain tokens within the search request and then identifying patterns of these tokens. Tokens include terms composed only of digits, section symbols, subsection symbols, and common statute reporter abbreviations. Sequences of these tokens are marked as a phrase so that the sequence is searched as a single search term.

320: The data to be searched will be spread across various different systems depending upon which jurisdictions were selected. The search request is split up and sent to the various search units. For example, "Combined Federal Courts" consists of 158 independent databases, which are distributed among 12 different computers. Each computer is host to from 1 to 10 copies of the Lexis Search and Retrieval (LSR) engines. The search Pre-Processing component routes the search request to the necessary computer locations to be processed by these LSR copies.

322: The Lexis Freestyle Search Engine identifies relevant documents using search process described in U.S. Pat. No. 5,692,176, which are incorporated herein by reference.

324: Case law documents are contained in databases, with each database containing a collection of documents and the index information needed to efficiently search those documents.

326: The reference information (data base location and document number and relevance score) for all found documents is bundled into a single answer set. At this point, the documents are ready to begin the retrieval process.

Figure 8:
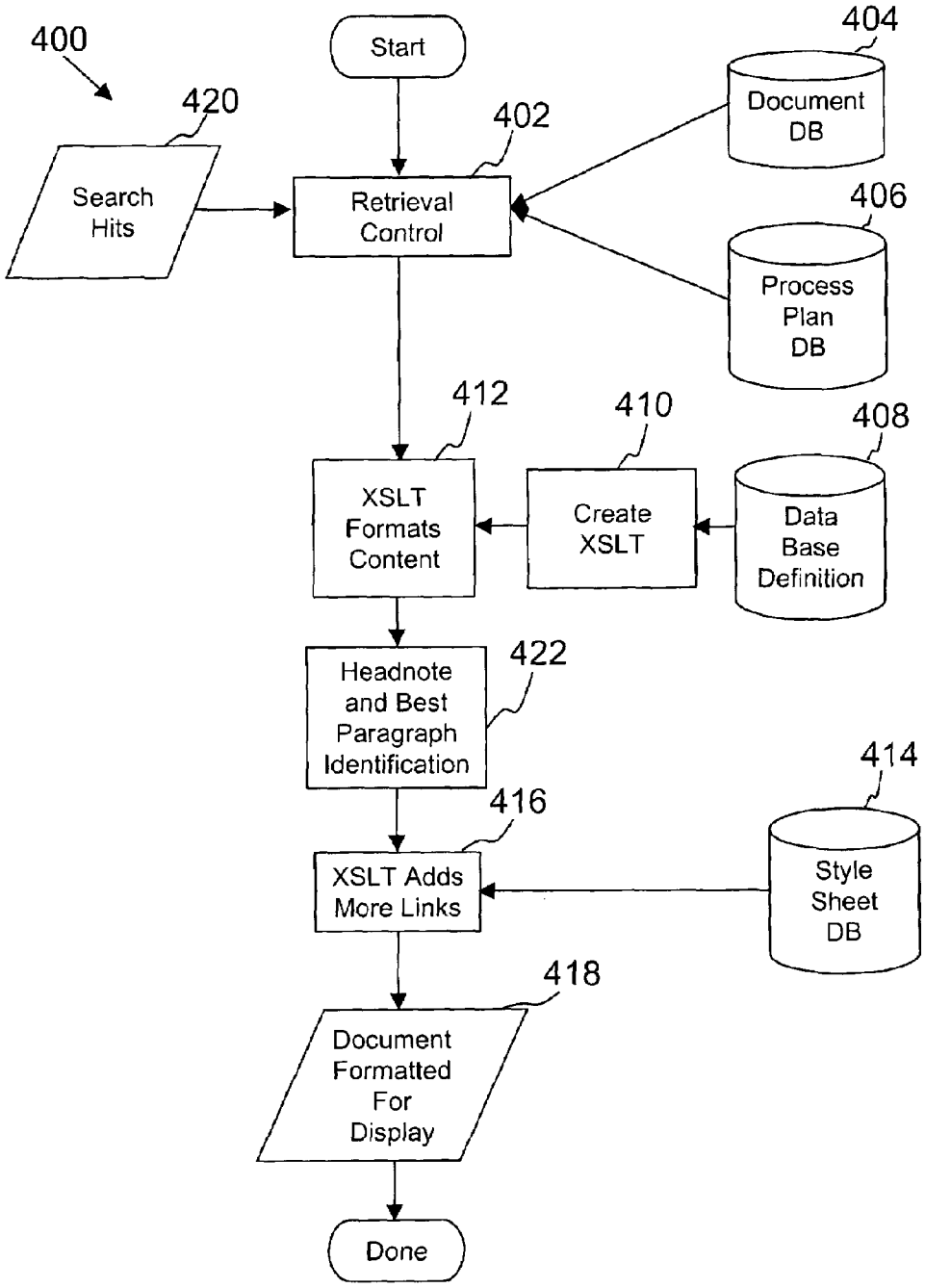
FIG. 8 is a high level flow diagram of the digest retrieval process corresponding to block 110 of FIG. 5.

FIG. 8 is a high level flow diagram of the digest retrieval process 400 corresponding to block 110 of FIG. 5, with blocks 402-418 corresponding to blocks 202-218 of FIG. 6, respectively. Blocks 420 and 422 of FIG. 8 represent the following additional steps:

420: The retrieval request includes "search hits," which identify each location within the document where a term (word or phrase) matched a search request term.

422: The search hits are processed within the document to generate relevance scores for all headnotes. An algorithm is used to determine which, if any, headnotes are discussing the same point of law as the original headnote that generated the MLTH search request. If no headnotes are found that are relevant, or no headnotes exist, paragraphs are scored and the highest scoring paragraph is selected.

Figure 9:
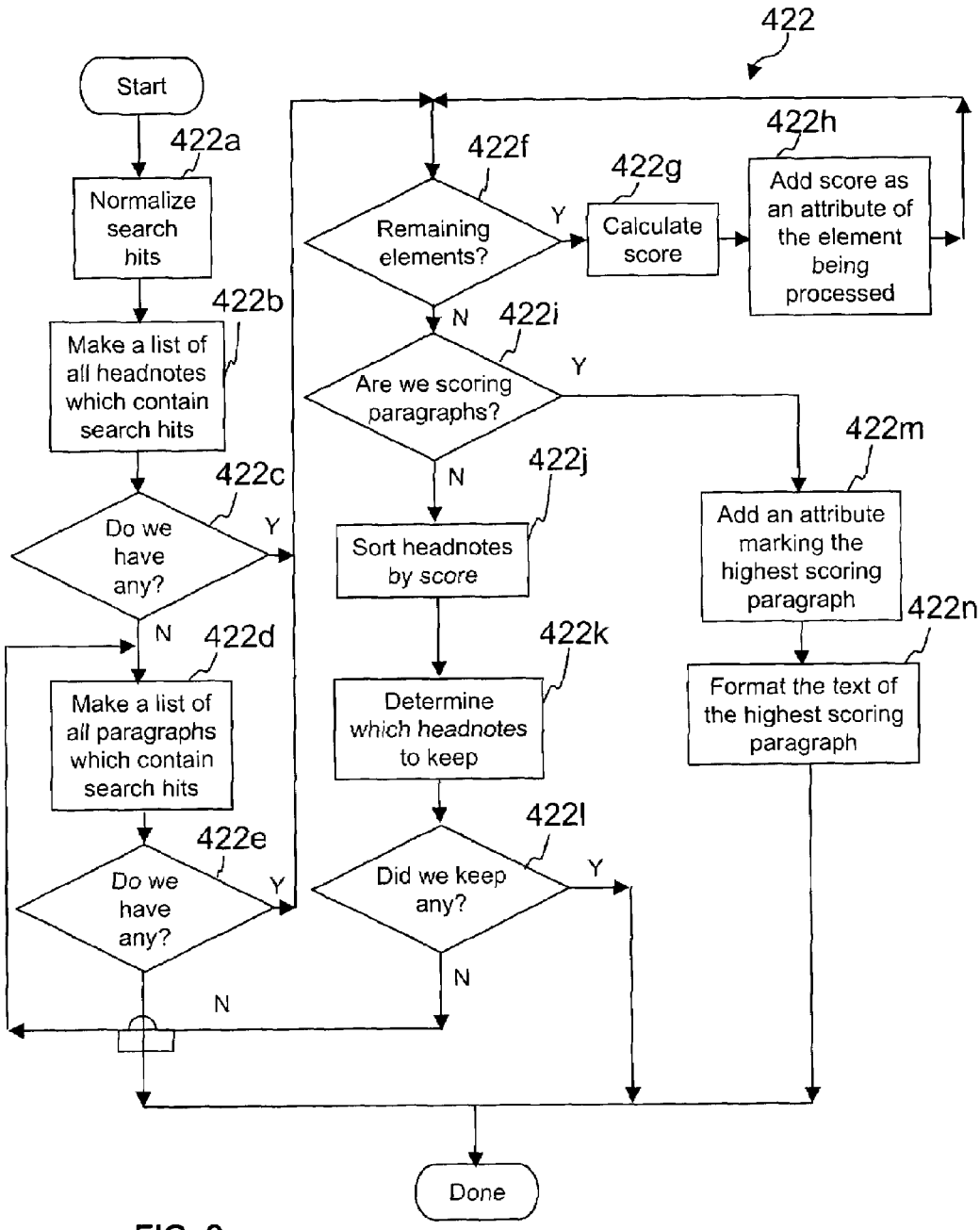
FIG. 9 is a high level flow diagram of the "Headnote and Best Paragraph Identification" process block found on the digest retrieval process flow diagram of FIG. 8.

FIG. 9 is a high level flow diagram of the "Headnote and Best Paragraph Identification" process block 422 found on the digest retrieval process flow diagram of FIG. 8. Blocks 1-14 of FIG. 9 represent the following steps:

422a: The normalized value of each search hit is added as an attribute of the hit element surrounding the text of the matched hit. As an example, this will allow the ranking system to identify "dog" as the same keyword as "dogs" when analyzing the search hits for uniqueness.

422b: The document is maintained in memory in an XML tree structure based upon the XML Document Object Model (DOM). XPATH functions are used to build a node set of elements. In this case, a node set of all headnote elements that have hit elements as children is built. This is treated as a list of elements.

422c: If the XPATH calls built a node set, the routine proceeds to score the elements. If they did not, it falls through to the best paragraph identification.

422d: XPATH is used to build a node set of all paragraph elements in the opinion segments of the case that have hit elements as children.

422e: If the XPATH calls built a node set, the routine proceeds to score the elements. If they did not, it exits with no best paragraph or headnotes identified.

422f: This step (checking for remaining elements) loops until all elements have been processed.

422g: The search hits under each element (whether it be a headnote or a paragraph) are analyzed and a score is calculated for that element. The calculated score is a four-byte hexadecimal number with the upper half-word representing the search term coverage and the lower half-word representing the overall search term frequency. Search term coverage is defined as how many unique search terms were hit in the element. Search term frequency is defined as the percentage of keywords within the element that were search term hits. With this configuration, an element that contains more of the search terms will always rank higher then an element that contains less of the search terms but at a higher frequency. Since the scores are dependent upon the input search string, they can only be analyzed in relation to the headnotes contained in the same document.

422h: The calculated score is added as an attribute of the element for which it was calculated.

422i: If the algorithm just finished scoring headnotes, it proceeds to identify which ones to keep. If the algorithm just finished scoring paragraphs, it proceeds to format the paragraph text.

422j: The headnotes are sorted by score.

422k: The algorithm determines which headnotes to keep. It first looks at the highest scoring headnote and determines whether or not it should be kept based on an absolute threshold. That threshold states the highest scoring headnote either has to have three unique search term hits or two unique search term hits and a term frequency of 57%. If the first was kept, the second highest scoring headnote is analyzed. In order to be kept, it must either have a score within 67% of the highest scoring headnote or be over a second absolute threshold. The second threshold states the headnote must have either four unique search term hits or have three unique search term hits and a term frequency of 86%. If a second headnote was kept, the third highest scoring headnote is analyzed with the same formula as the second. The algorithm will select at most three headnotes. The thresholds used were established empirically using a training set, and could be changed depending on the results desired.

422l: If one to three headnotes were selected, the routine is finished. If 0 were selected, paragraphs are scored (go to step 422d).

422m: An attribute is added to the highest scoring paragraph marking it as the best paragraph.

422n: A sliding window formatter is applied to the text of the paragraph. The window that yields the greatest percentage of hits is identified. That window is marked, and the routine is finished.

Upon completion, the value added to the XML document by this process will allow the final XSLT step in the retrieval process to finalize the document for display.

The steps followed by a user to run a "More Like This Headnote" search will now be described. The user first locates (for example, by performing an interactive legal database search using the Lexis Research System) a headnote 10 that contains language the user wants to find in other cases (FIG. 1). The user then clicks a "More Like This Headnote" link 10a next to the headnote 10 to display a "More Like This Headnote" dialog box 20 (FIG. 2). In the "More Like This Headnote" dialog box 20, the user can select the jurisdiction 20a and date 20b to which the search is to be restricted, or the user can select the menus 20c and 20d to search all jurisdictions and all dates (FIG. 2). The user then clicks on the "Search" button 20e.

Figure 4A:
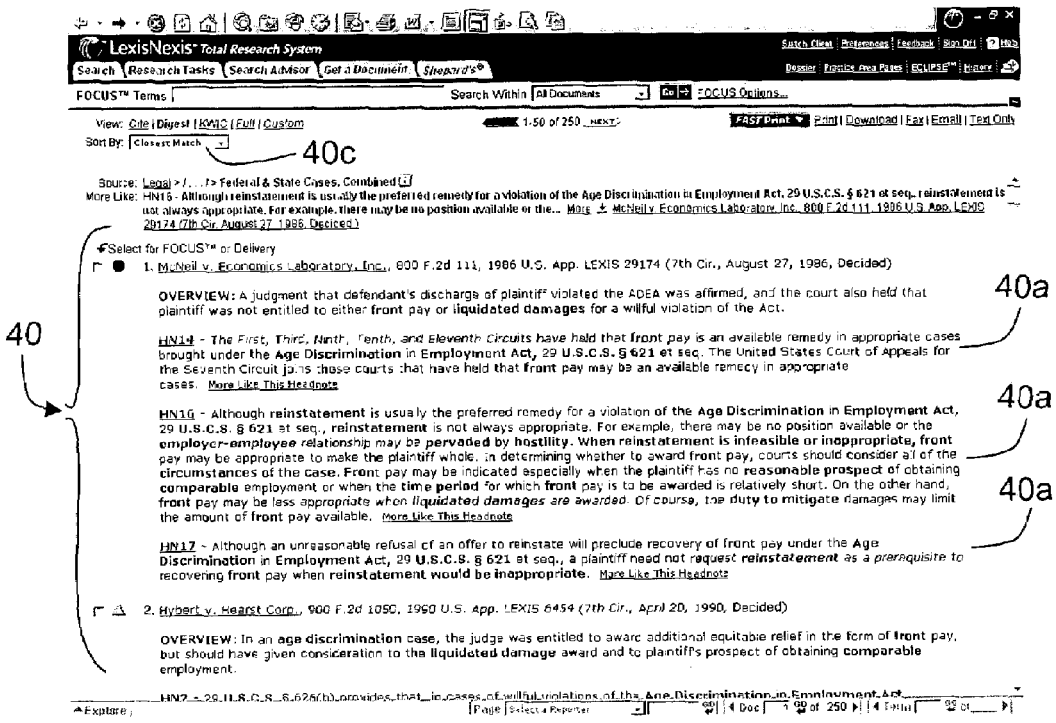
FIG. 4A illustrates the top portion of an exemplary screen display of the results of a "More Like This Headnote" search.
Figure 4B:
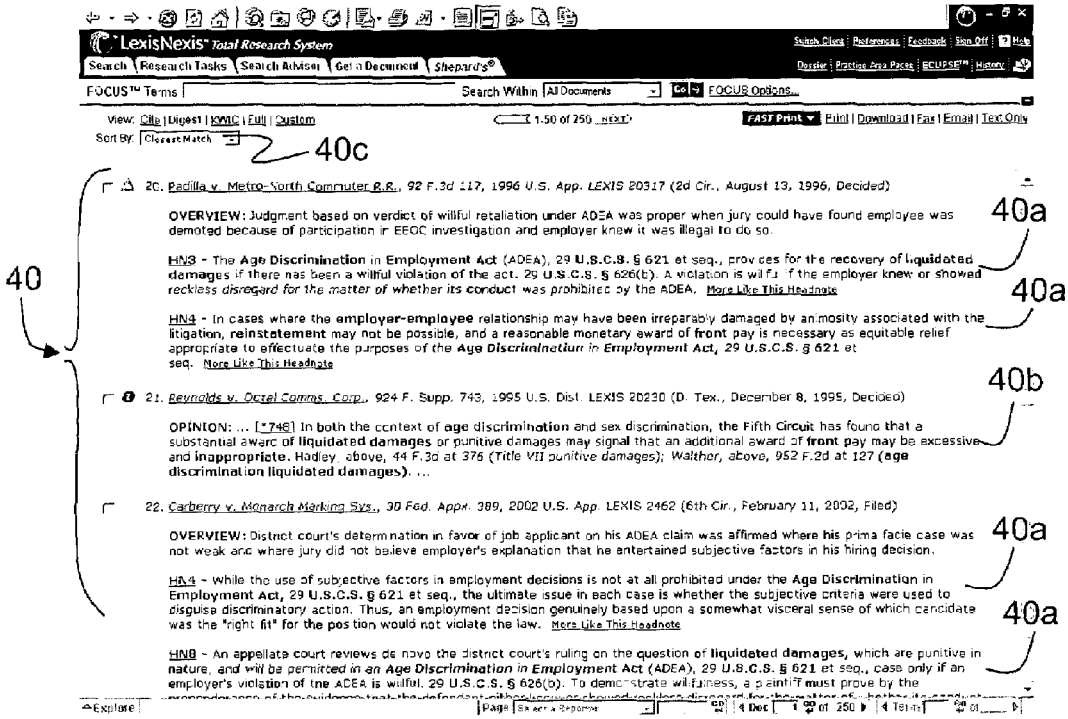
FIG. 4B illustrates the middle portion of an exemplary screen display of the results of a "More Like This Headnote" search.
Figure 4C:
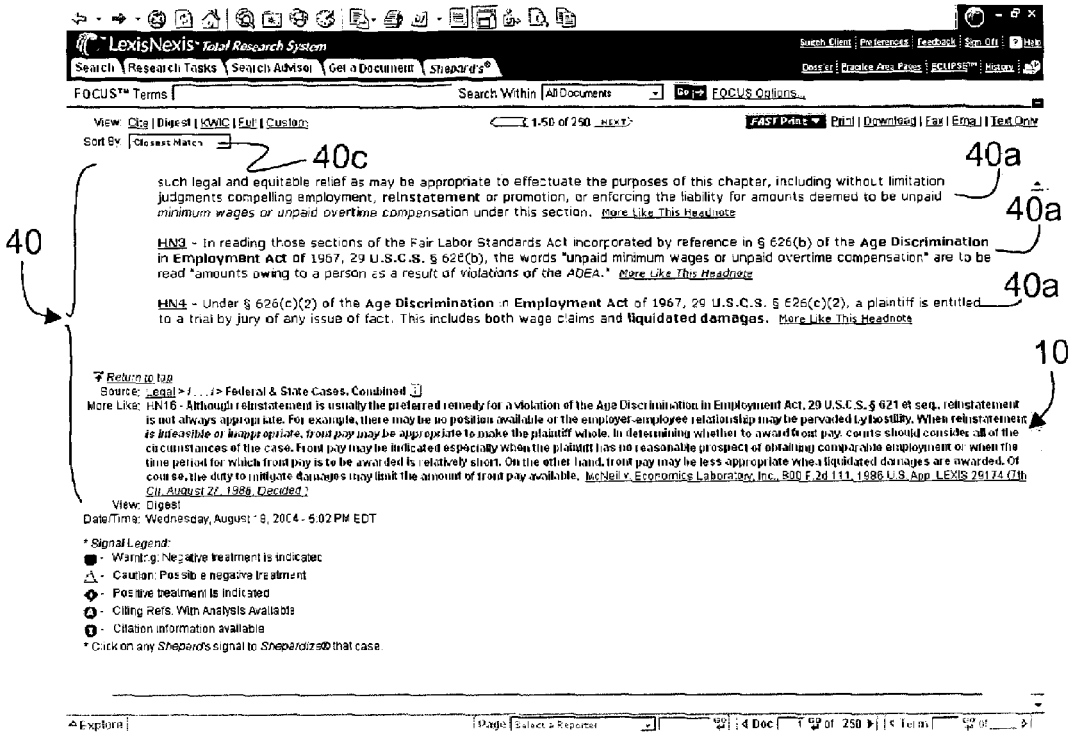
FIG. 4C illustrates the bottom portion of the screen display of FIG. 4A.

If no cases are found, a message 30 to that effect is displayed on the user's computer monitor (FIG. 3). Otherwise, the search results 40 are displayed (FIGS. 4A and 4B). The Digest View is the default display format for the answer set. The Digest View displays matching headnotes 40a or the matching language 40b from cases that do not have headnotes. The user can use the "Sort By" drop-down list 40c to sort his or her results by "Closest Match," "Court/Date," or "Date."

Modifications and variations of the above-described embodiments of the present invention are possible, as appreciated by those skilled in the art in light of the above teachings. For example, the described method generates the search request from the MLTH link within the document. Alternately, the MLTH link could generate a second retrieval to produce the search request, thereby reducing the amount of data required within the link upon initial display of the document. It is therefore to be understood that, within the scope of the appended claims and their equivalents, the invention may be practiced otherwise than as specifically described.

What is claimed is:

1. A search method for locating documents *in a database* discussing a selected idea, implemented by a computer programmed to perform the steps of:

(a) in response to a user selecting a document having a body discussing ideas, displaying the selected document to the user in a computer screen display in a format with headnotes, wherein the headnotes represent significant ideas identified in the body of the document;

(b) in response to user selection of one of the headnotes in the display of the selected document, processing the text of the selected headnote to identify phrases and generating a search request based on the processed text;

(c) using an associative text search engine to conduct a database search using the search request to locate other documents [discussing similar ideas] *relevant to an idea discussed in the selected headnote*; and (d) using retrieval logic to present to the user in [a] *the* computer screen display, [the] results of the search in a digest view comprising at least one of related headnotes and best text, sorted by user-selected options.

2. The search method of claim 1, further comprising the step of inserting [special links] *a link* for *one or more of* the headnotes of the selected [case] *document*, prior to step (a), *wherein user selection of an individual link for an individual headnote initiates steps* (*a*)-(*d*).

3. The search method of claim 1, further comprising the step of using relevance ranking to rank [the] results of the search of step (c) based upon statistical similarity to the idea *discussed* in the selected headnote, between steps (c) and (d).

4. The search method of claim 1, wherein the database is an interactive legal database, wherein the documents are legal cases, and wherein the ideas are points of law.

5. A search method for locating documents discussing a selected [idea] *point of law*, implemented by a computer programmed to perform the steps of:

(a) retrieving from a database a document requested by a user, wherein the document has a body discussing

[ideas] *point of law* and at least one headnote representing a [significant idea] *point of law* identified in the body;

(b) displaying the retrieved document to the user in a computer screen display in a format in which the at least one headnote is displayed;

(c) generating a search request based at least on a headnote selected by the user in the display of the retrieved document;

(d) running an associative text search using the search request to identify documents relevant to the [idea] *point of law* represented by the selected headnote, the identified documents defining an answer set;

(e) identifying which, if any, headnotes of the documents in the answer set represent the same [idea] *point of law* as the selected headnote;

(f) determining which, if any, of the identified headnotes are [sufficiently] relevant to the [idea] *point of law* represented in the selected headnote to display to the user *by scoring the identified headnotes, wherein headnotes having a relevance score that satisfies one or more thresholds are identified as relevant*;

(g) if a document in the answer set has no headnotes or has no headnotes representing the same [idea] point *of law* as the selected headnote, identifying portions of text in the document most relevant to the [idea] *point of law* represented in the selected headnote;

(h) determining which, if any, of the identified portions of text are [sufficiently] relevant to the [idea] *point of law* represented in the selected headnote to display to the user *by scoring the identified portions of text*;

(i) if there are [sufficiently] relevant portions of text to display to the user, identifying the most relevant portion of text *having a highest relevance score*; and (i) displaying the relevant headnotes, if any, and the relevant portions of text, if any, to the user in [a] *the* computer screen display in a digest view with a list of [the] citations of the documents in the answer set.

6. The search method of claim 5, further comprising the steps of:

following step (a), formatting the document for display to the user with hyperlinks associated with at least some of the headnotes, whereby the formatted document is displayed to the user in step (b), and following step (b), displaying a search form to the user in [a] *the* computer screen display, in response to the user clicking on one of the hyperlinks, wherein the search form enables the user to enter parameters to restrict the search.

7. The search method of claim 6, wherein the [interactive] database is [a] *an interactive* legal database[, wherein] *and* the documents are legal cases[, and wherein the ideas are points of law].

8. The search method of claim 7, wherein:

the search form allows the user to specify a jurisdiction and a date restriction, and in step (c) the search request is generated based also on any jurisdiction and date restriction specified by the user

9. The search method of claim 8, wherein:

the jurisdiction is associated with at least one database, in step (d), the search request is used to identify relevant cases contained in the at least one database associated with the selected jurisdiction, each of the cases contained in the at least one database is associated with reference information indicating at least the locations in the database of the cases, and in step (d), the answer set includes the reference information for all identified relevant cases.

10. The search method of claim 5, wherein in step (c), the text of the headnote is edited to generate the search request.

11. The search method of claim 10, wherein in step (c), the headnote text is edited by:

subjecting [it] *the headnote text* to a phrase recognition process and identifying keywords in the headnote text, and if [the] *a* number of keywords identified in the headnote text is greater than a set threshold, applying rules to remove terms from the search request.

12. The search method of claim 10, wherein in step (c), the headnote text is edited by identifying statute references in the headnote text and marking [them] *the statute references* as phrases in the search request.

13. A search system for locating documents discussing a selected [idea] *point of law*, implemented using programmable data processing apparatus including computer-readable memory and a display device for displaying information to a user in a *computer* screen display, the search system comprising:

means for retrieving from a database stored in [the] memory a document requested by a user, wherein the document has a body discussing [ideas] *points of law* and at least one headnote representing a [significant idea] *point of law* identified in the body;

means for displaying the retrieved document to the user in the *computer* screen display in a format in which the at least one headnote is displayed;

means for generating a search request based at least on a headnote selected by the user in the display of the retrieved document;

means for identifying documents relevant to the [idea] *point of law* represented in the selected headnote, based on the search request, the identified documents defining an answer set;

means for identifying which, if any, headnotes of the documents in the answer set discuss the same [idea] *point of law* as the selected note;

means for determining which, if any, of the identified headnotes are [sufficiently] relevant to the [idea] *point of law* represented in the selected headnote to display to the user *based on relevance scores*;

means for identifying portions of text in the document most relevant to the [idea] *point of law* represented in the selected headnote, if a [case] *document* in the answer set has no headnotes or has no headnotes discussing the same [idea] *point of law* as the selected headnote;

means for determining which, if any, of the identified portions of text are [sufficiently] relevant to the [idea] *point of law* represented by the selected headnote to display to the user in [a] *the* computer screen display;

means for identifying the most relevant portion of text *based on relevance scores of the identified portions of text*, if there are [sufficiently] relevant portions of text to display to the user in [a] *the* computer screen display; and means for displaying the relevant headnotes, if any, and the relevant portions of text, if any, to the user in a computer screen display in a digest view with a list of [the] citations of the identified documents.

14. The search system of claim 13, further comprising means for formatting the retrieved document for display to the user with hyperlinks associated with at least some of the headnotes, for display to the user by the means for displaying, and wherein the means for displaying performs the further function of displaying a search form to the user in response to the user clicking on one of the hyperlinks.

15. The search system of claim 14, wherein the database is a legal database[, wherein] *and* the documents are legal cases[, and wherein the ideas are points of law].

16. The search system of claim 15, wherein:

the search form allows the user to specify a jurisdiction and a date restriction, and wherein the means for generating generates the search request is generated based also on any jurisdiction and date restriction specified by the user.

17. The search system of claim 16, wherein:

the jurisdiction is associated with at least one database, the means for identifying relevant cases identifies relevant cases contained in the at least one database associated with the selected jurisdiction, each of the cases contained in the at least one database is associated with reference information indicating at least the locations in the database of the cases, and the answer set includes the reference information for all identified relevant cases.

18. The search system of claim 13, wherein the means for generating a search request performs the further function of editing the text of the headnote to generate the search request.

19. The search system of claim 18, wherein the means for generating a search request performs the further function of subjecting the text of the headnote to a phrase recognition process and identifying keywords in the headnote text, and edits the headnote text by applying rules to remove terms from the search request if [the] *a* number of keywords identified in the headnote text is greater than a set threshold.

20. The search system of claim 18, wherein the means for generating a search request performs the further function of identifying statute references in the headnote text and edits the headnote text by marking them as phrases in the search request.

* * * * *